United States Patent Office 3,547,975
Patented Dec. 15, 1970

3,547,975
PROCESS FOR THE HYDRODIMERIZATION OF ACRYLIC ACID DERIVATIVES
Yael Arad, Tel Aviv, and Moshe Levy and David Vofsi, Rehovoth, and Haim Rosen, Ramat Gan, Israel, assignors to UCB (Union Chimique-Chemische Bedrijven) S.A., Saint-Gilles-Brussels, Belgium
No Drawing. Filed Mar. 11, 1968, Ser. No. 711,852
Claims priority, application Israel, Oct. 11, 1967, 28,746
Int. Cl. C07c 121/20, 121/26, 121/00
U.S. Cl. 260—465.4                        7 Claims

ABSTRACT OF THE DISCLOSURE

In the process for the hydrodimerization of acrylic acid derivatives, more particularly acrylonitrile, 1-methyl-acrylonitrile and lower alkyl acrylates, to form adipic acid derivatives by contacting one or two of the mentioned acrylic acid derivatives with an alkali metal amalgam in anhydrous liquid ammonia containing a source of protons dissolved therein, the improvement that phenol is used as the source of protons.

---

This invention relates to the hydrodimerization of acrylic acid derivatives, especially acrylonitrile and lower-alkyl acrylates as well as methacrylates to form adipic acid derivatives. The invention is an improvement of the invention (hereinafter called "main invention") claimed in the U.S. patent specification Ser. No. 655,108.

The main invention provides a process for the hydrodimerization of acrylic acid derivatives by means of alkali metal amalgam wherein the reaction is carried out in an anhydrous medium consisting of liquid amomnia in which an ammonium or amine salt is dissolved. Ammonium chloride, ammonium sulfate and triethylamine hydrochloride have been specifically disclosed as the ammonium or amine salts thus used.

According to the present invention, the hydrodimerization of acrylic acid derivatives by means of alkali metal amalgam is carried out in an anhydrous medium consisting of liquid ammonia in which phenol is dissolved.

It is assumed that the phenol dissolved in the liquid ammonia is converted at least in part into ammonium phenolate.

It has been found that the addition of phenol to the liquid ammonia reaction medium favourably influences the yield of the corresponding adipic acid derivatives. In the case of acrylonitrile or acrylic acid esters the amount of phenol present in the liquid ammonia reaction medium is less critical for achieving a good yield than is the presence of inorganic ammonium salts, such as chloride or sulfate, in accordance with the main invention, as an even slight excess of such inorganic ammonium salt over the optimal proportion makes the yield of adipic acid derivative drop sharply. Moreover, the amount of undesired hydrogenated monomer, e.g. propionitrile where acrylonitrile is the starting material, is decreased if phenol is used as the additive instead of an inorganic ammonium salt.

The process according to the invention is suitable both for homohydrodimerization, i.e. the case in which a single acrylic acid derivative is used as the starting material, and for hetero-hydrodimerization, where two different acrylic acid derivatives serve as starting materials. In the latter case, the relative proportions of the hetero-dimers and the co-produced homo-dimers can be controlled by the appropriate selection of the proportion of the different acrylic acid derivatives used as starting materials. The mixture of hetero-dimers and homo-dimers may be resolved into its components by any suitable methods, e.g. fractional distillation, preferably in vacuo. On the other hand such mixtures may be useful raw materials for the manufacture of polyamides having certain desired properties.

The invention is illustrated by the following examples:

EXAMPLE 1

10 g. of acrylonitrile and 19 g. of phenol were dissolved in 200 cc. of liquid ammonia. 2 kg. of sodium amalgam (containing 0.3% by weight of sodium) were cooled in a flask to −30° C. in a Dry Ice-alcohol bath. The ammoniacal solution of acrylonitrile was poured slowly into the amalgam flask and the mixture was stirred for 5 minutes. The spent amalgam was then separated from the reaction mixture and the ammonia was distilled off. The nitriles were separated from the sodium phenolate and subjected to fractional distillation. The adiponitrile distilled at 182° C. at a pressure of 20 mm. Hg.

The products consisted of 9.2 g. of adiponitrile amounting to a yield of 92%. The metal conversion yield was 90%.

EXAMPLE 2

10 g. of 1-methyl-acrylonitrile and 15 g. of phenol were dissolved in 200 cc. of liquid ammonia and the reaction with sodium amalgam was carried out as described in Example 1. The products were separated as described in Example 1. The dimethyl adiponitrile obtained consisted of a mixture of d,l and meso dimethyl adiponitrile boiling at 110° and 116° C. respectively, at a pressure of 0.4 mm. Hg.

The yield consisted of 85% of dimethyl adiponitrile and 5% of isobutyronitrile. The metal conversion yield was 92%.

EXAMPLE 3

10 g. of ethyl acrylate and 10 g. of phenol were dissolved in 200 cc. of liquid ammonia and the reaction with sodium amalgam was carried out as described in Example 1. The products were separated as in Example 1. The diethyl adipate was distilled at 240° C. The yields were 87% diethyl adipate and 2% ethyl propionate. The metal conversion yield was 90%.

EXAMPLE 4

5 g. of acrylonitrile, 10 g. of 1-methyl-acrylonitrile and 23 g. of phenol were dissolved in 200 g. of liquid ammonia and the reaction with sodium amalgam was carried out as described in Example 1. The products consisted of adiponitrile, methyl adiponitrile and dimethyl adiponitrile in the ratio of 1.7:2:1. These products can be recovered singly by fractional distillation in vacuo.

EXAMPLE 5

10 g. of acrylonitrile, 10 g. of ethyl acrylate and 28 g. of phenol were dissolved in 200 cc. of liquid ammonia and reaction with sodium amalgam was carried out as described in Example 1. The products consisted of adiponitrile, cyano ethyl valerate and diethyl adipate in the ratio of 2:6:1.3. These products can be recovered singly by fractional distillation in vacuo.

We claim:
1. In a process for the hydrodimerization of acrylic acid derivatives selected from the group consisting of acrylonitrile, 1-methyl-acrylonitrile and lower alkyl acrylates to form adipic acid derivatives by contacting one or two of said acrylic acid derivatives with an alkali metal amalgam in a reaction medium of anhydrous liquid ammonia containing a source of protons dissolved therein, the improvement that the source of protons is phenol dissolved in said reaction medium.
2. The process as claimed in claim 1, wherein the reaction medium is maintained at a temperature of about −30° C.

3. The process as claimed in claim 2, wherein the acrylic acid derivative used as starting material is acrylonitrile and the final adipic acid derivative is adiponitrile.

4. The process as claimed in claim 2, wherein the acrylic acid derivative used as starting material is 1-methyl-acrylonitrile and the final adipic acid derivative is dimethyl-adiponitrile.

5. The process as claimed in claim 2, wherein the acrylic acid derivative used as starting material is ethyl acrylate and the final adipic acid derivative is diethyl adipate.

6. The process as claimed in claim 2, wherein a mixture of acrylonitrile and 1-methyl-acrylonitrile is used as starting material and the final products consist of adiponitrile, methyl-adiponitrile and dimethyl adiponitrile.

7. The process as claimed in claim 2, wherein a mixture of acrylonitrile and ethyl acrylate is used as starting material and the final products consist of adiponitrile, ethyl cyanovalerate and diethyl adipate.

References Cited
UNITED STATES PATENTS 3,193,574  7/1965  Katchalsky et al. ___ 260—465.8

JOSEPH P. BRUST, Primary Examiner

U.S. Cl. X.R.

260—465.1, 465.8, 485, 561